United States Patent [19]
Isaacs

[11] Patent Number: 5,562,195
[45] Date of Patent: Oct. 8, 1996

[54] METHOD AND APPARATUS FOR SEPARATING FEEDING AND SORTING

[75] Inventor: Gerald A. Isaacs, Arlington, Tex.

[73] Assignee: ElectroCom Automation, L.P., Arlington, Tex.

[21] Appl. No.: 351,879

[22] Filed: Dec. 8, 1994

Related U.S. Application Data

[63] Continuation of Ser. No. 996,152, Dec. 23, 1992, abandoned, which is a continuation of Ser. No. 593,783, Oct. 5, 1990, Pat. No. 5,201,397.

[51] Int. Cl.$^6$ .............................. B65G 43/00; B65H 7/02
[52] U.S. Cl. .................... 198/460.1; 198/461.1; 271/227; 271/259; 271/265.02; 271/270
[58] Field of Search ............................. 198/395, 396, 198/456, 460.1, 502.2, 461.1; 271/199, 202, 227, 258.01, 259, 265.01, 270, 265.02; 209/583, 900

[56] References Cited

U.S. PATENT DOCUMENTS

| | | | |
|---|---|---|---|
| 2,593,206 | 4/1952 | Short | 250/52 |
| 4,150,743 | 4/1979 | Lazzarotti et al. | 198/460 |
| 4,240,538 | 12/1980 | Hawkes et al. | 198/460 X |
| 4,503,976 | 3/1985 | Cloud et al. | 209/564 X |
| 4,697,689 | 10/1987 | Carrell | 198/396 X |
| 4,838,435 | 6/1989 | Alexandre et al. | 209/914 X |
| 4,863,154 | 9/1989 | Hirakawa et al. | 198/460 X |
| 4,897,587 | 12/1990 | DiGiulio et al. | 318/625 |
| 5,069,440 | 12/1991 | Lazzarotti et al. | 198/460 X |

FOREIGN PATENT DOCUMENTS

| | | | |
|---|---|---|---|
| 0167091 | 6/1985 | European Pat. Off. | |
| 1105342 | 12/1961 | Germany | |
| 2182299 | 5/1987 | United Kingdom | 198/460 |

*Primary Examiner*—William E. Terrell
*Assistant Examiner*—Tuan Nguyen
*Attorney, Agent, or Firm*—Harold E. Meier

[57] ABSTRACT

A method and apparatus for separating, feeding and sorting stacked products utilizes a computer controlled conveyor transport path. The transport path comprises infeed, separating and output sections. The infeed section includes an infeed conveyor and feed roller to regulate downstream movement into the separating section. The separating section includes a plurality of individually and selectively controlled friction feeder rolls arranged on a laterally tilted incline plane. The method and apparatus includes sensors along the separating section for determining position and relative movement of products. Through computer control, individual feeder rolls or sets of feeder rolls on the inclined plane are selectively energized to separate underlying products from stacked overlying or overlapping products. The foregoing process is repeated until all products in a stack have been separated into individual units. After separation the individual products are discharged through the output section for further processing.

13 Claims, 10 Drawing Sheets

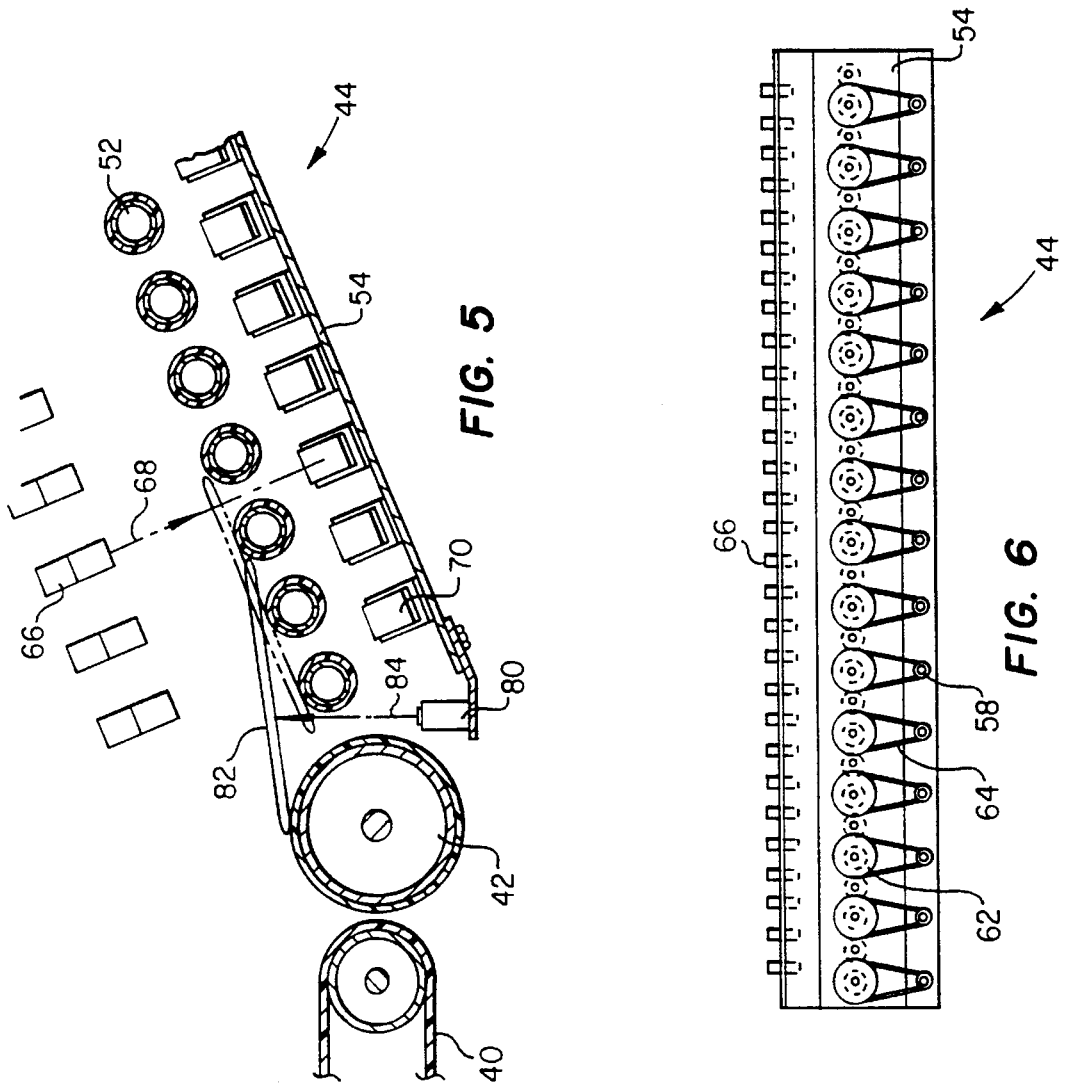
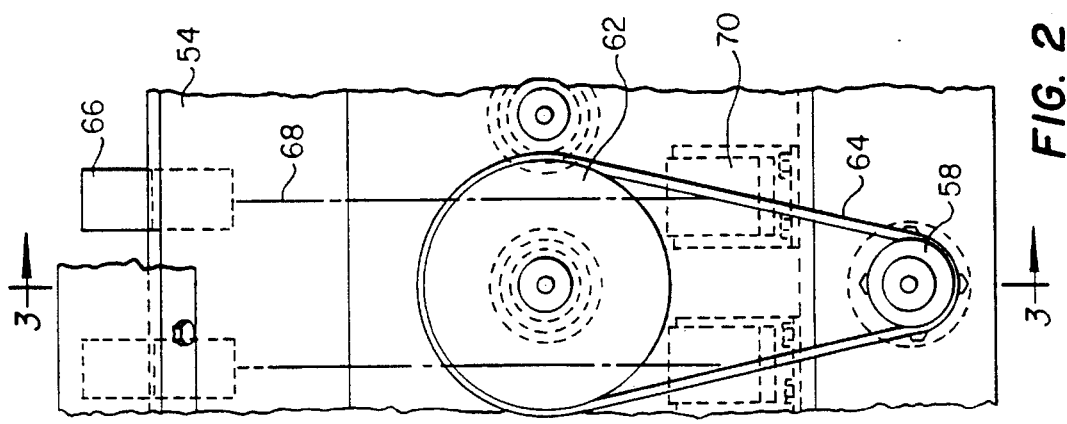

METHOD AND APPARATUS FOR SEPARATING FEEDING AND SORTING

CROSS-REFERENCE TO RELATED APPLICATIONS

This Application is a continuation of Ser. No. 07/996,152, Dec. 23, 1992, now abandoned; which is a continuation of Ser. No. 07/593,783, Oct. 5, 1990, now U.S. Pat. No. 5,201,397.

TECHNICAL FIELD

This invention relates to the separating, feeding and sorting of flat packages, and more particularly to a method and apparatus for separating, feeding and sorting characterized by controlled movement of products through a transport path.

BACKGROUND OF THE INVENTION

Heretofore, many products were separated and sorted by individual human operators who segregated the products for further processing. One of the drawbacks of this manual system of processing was that total processing time was a function of each human operator's familiarity with the product. An operator who was unfamiliar with the product or who was confronted with an unrecognized product would be forced to make a manual check to ensure proper separation. This resulted in delays in the separating and sorting process, reducing the daily throughput and cutting into the profits of the operation.

An additional drawback of the human operator sorting is its susceptibility to error. A bored or careless operator may fail to correctly separate bulk products. This reflects poorly on the operation both economically and in terms of customer goodwill.

SUMMARY OF THE INVENTION

The present invention overcomes the foregoing problems associated with manual sorting by providing an apparatus for separating, feeding and sorting stacked bulk products. In accordance with the broader aspects of the invention, a computer controlled conveyor mechanism characterized by an infeed conveyor belt, an inclined and tilted roller separator, an output conveyor belt, and a divert gate, receives stacked products at the upstream input end, separates the products into a single stream, determines if each qualifies for sorting and sorts the product into designated bins at the output end.

The infeed conveyor belt receives bulk stacks of products from a human loader and transports the products downstream to a feed roller. A sensor at the upstream end of the separator controls access to the separator. When the sensor detects the absence of a product resting on the upstream edge of the separator, the computer directs the apparatus to automatically deliver more products to the separator by causing the infeed conveyor belt to jog forward and the feed roller to rotate.

The separator consists of a series of individually and selectively controlled friction feeder rolls laterally tilted and arranged on an inclined plane. The inclination of the feeder rolls facilitates the use of gravitational forces to assist in separation of stacked and overlapping products. Rotation of the feeder rolls further assists the separation process by causing downstream movement of underlying products. Because the friction coefficient between the feeder rolls and the product is higher than that between two products and because of the angle of incline of the separator, the overlying products tend to slide in an upstream direction away from the underlying single product. Downstream movement of underlying products separates stacked products into a sequence of individual units. The computer monitors the location of each product on the separator and prevents "tailgating" of preceding products by maintaining a minimum distance between consecutive products. Each individual product is then propelled out of the separator onto the output conveyor belt. The lateral tilt of the feeder rolls causes each product to slide against one edge of the conveyor mechanism. This facilitates the sorting process at the output conveyor belt as described below.

In one application of the present invention, after the stacked products have been separated, lined up in a single file fashion against one edge and discharged onto the output conveyor belt, a bar code scanner reads a bar code on each product and compares it to a list of reference bar codes stored in the control computer. Accurate bar code scanning and sorting is facilitated by the location of each separated product against the edge of the conveyor mechanism. The scanner has a narrow field of view and scanning accuracy is maximized by locating the separated products against the edge of the conveyor mechanism adjacent to the scanner.

After scanning, the output conveyor belt transports the separated products to a sorting divert gate. If the bar code scanner fails to find a bar code on a scanned product, the computer causes the divert gate to direct the product into a first bin where the operator may reprocess the product through the present invention. If the bar code matches a stored bar code, the computer causes a divert gate to direct the product to a selected bin where it is assembled for further processing. Thus, bulk stacks of products are sorted more accurately and efficiently than the manual systems presently in use.

The automated separating, feeding and sorting apparatus of this invention may be adapted to process various stacks of flat packages with attached identifying bar codes. Possible applications include sorting of magazines, postal mail and warehouse inventory. Other advantages and applications deriving from the use of the invention will readily suggest themselves to those skilled in the art from consideration of the following detailed description taken in conjunction with the accompanying drawings.

BRIEF DESCRIPTION OF THE DRAWINGS

A more complete understanding of the invention may be had by reference to the following Detailed Description when taken in conjunction with the accompanying Drawings, wherein:

FIG. 2 is a side view of an individual feeder roll of the separator shown in FIG. 1;

FIG. 5 is a partial side view of the apparatus of FIG. 1 showing the interrelation between the infeed conveyor belt, feed roller and feeder rolls;

FIG. 6 is a side view of the separator illustrated in FIG. 4; and

DETAILED DESCRIPTION OF THE INVENTION

Figure 1:
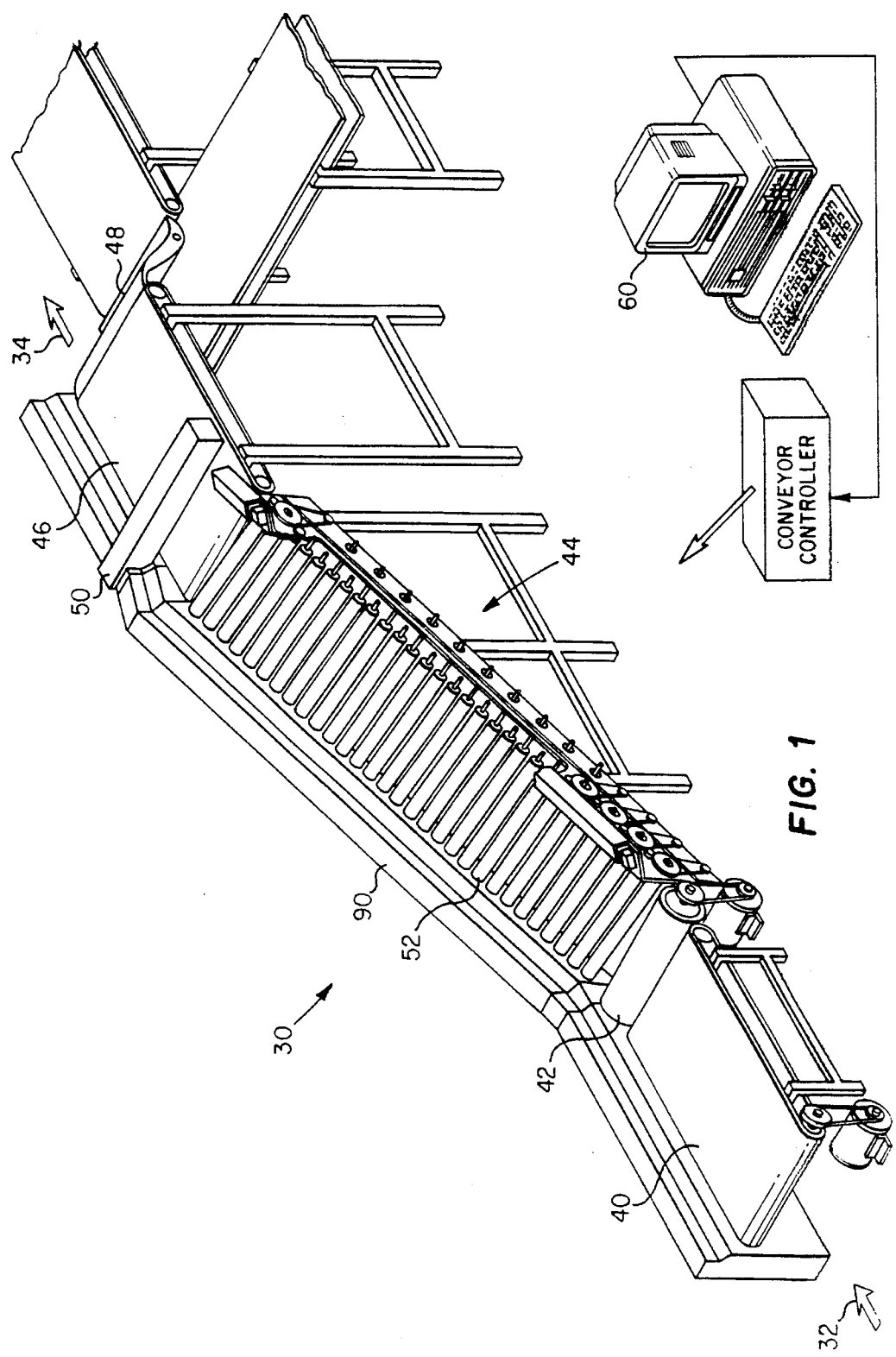
FIG. 1 is a perspective view of the separating, feeding and sorting apparatus in which parts have been cut away to more clearly illustrate certain features of the invention.
Figure 3:
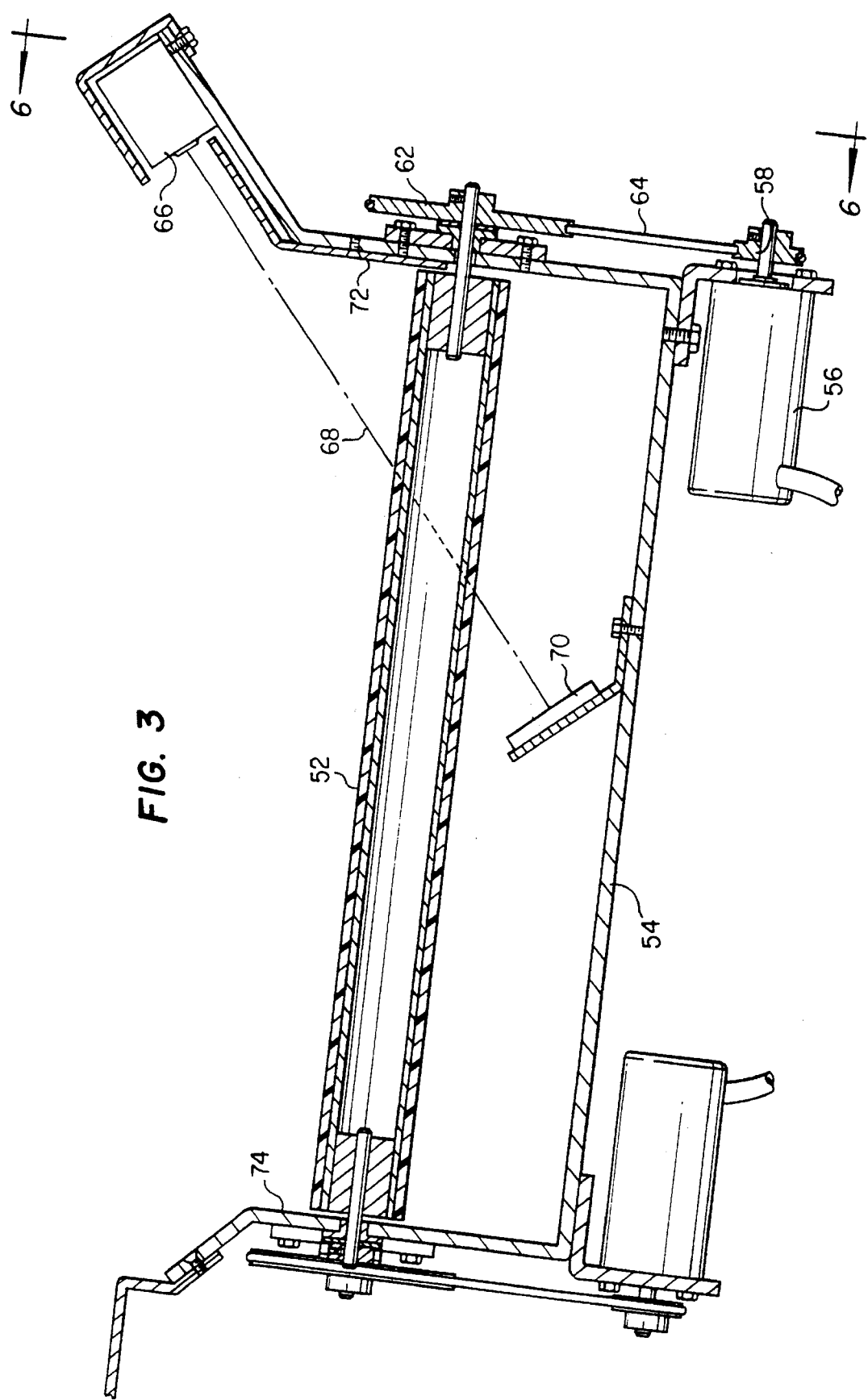
FIG. 3 is a front elevation of an individual feeder rolls as shown in FIG. 2 of the separator shown in FIG. 1.
Figure 4:
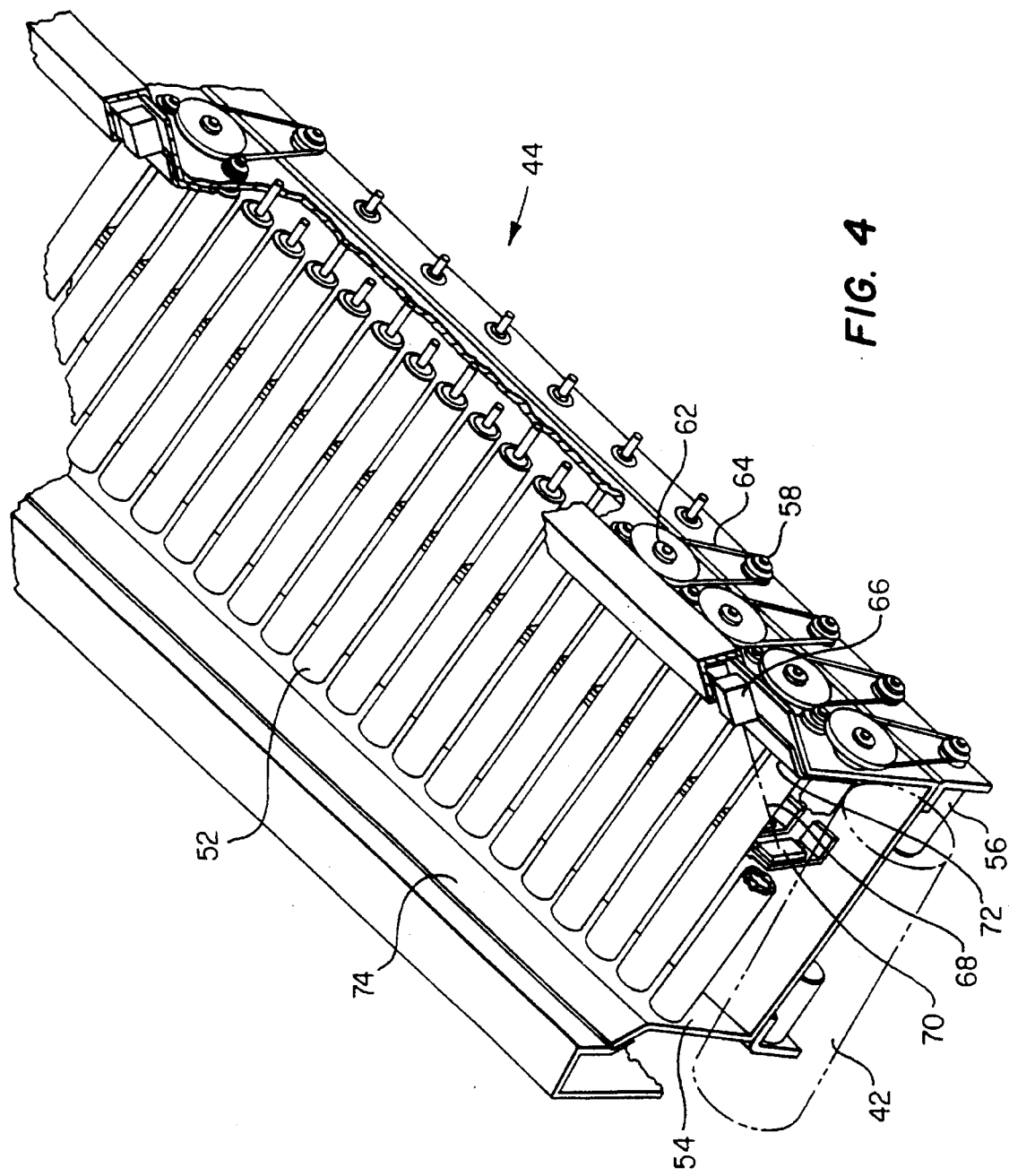
FIG. 4 is a partial perspective view of the apparatus of FIG. 1 showing the feeder rolls and feed roller.
Figure 7A:
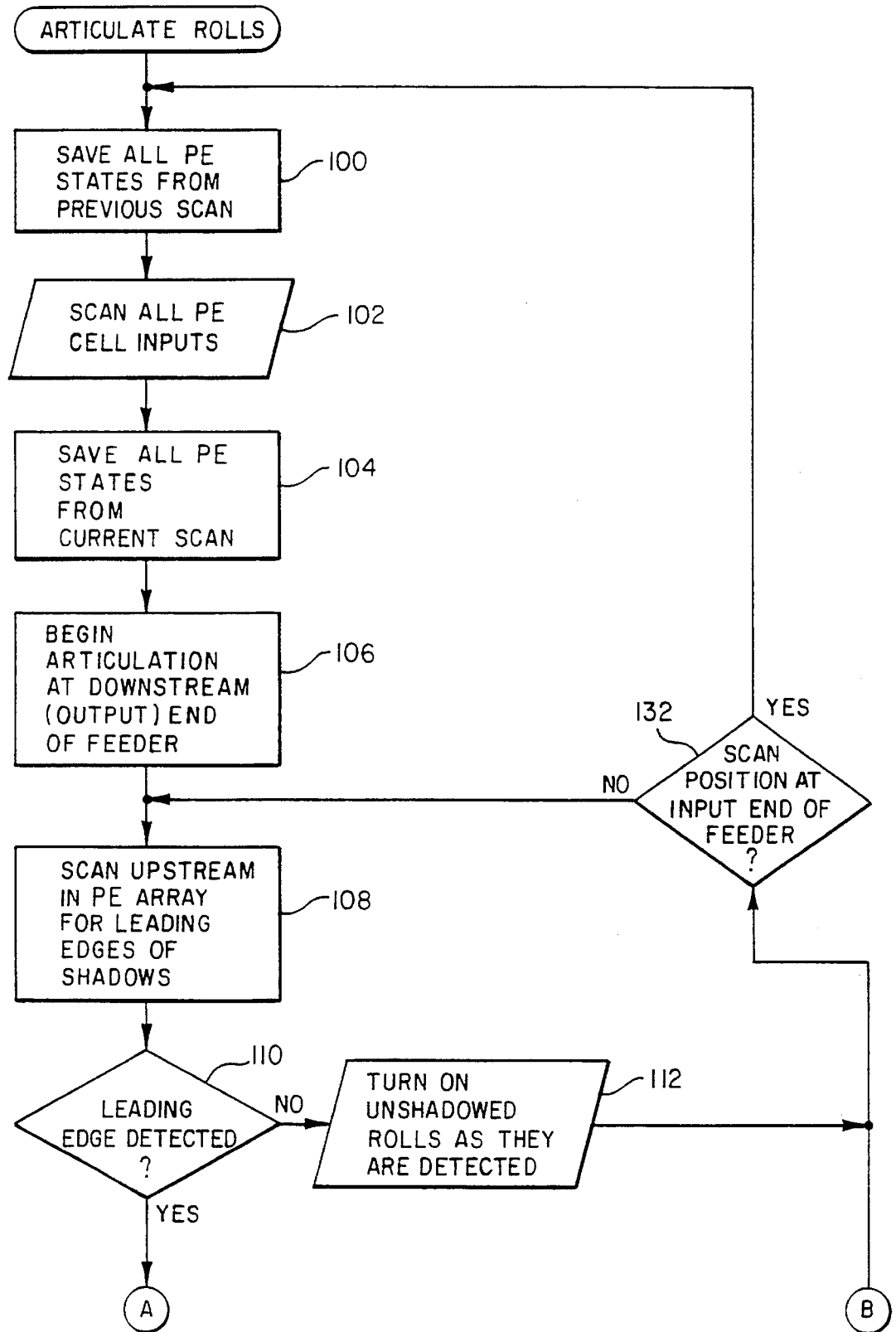
FIGS. 7A, 7B, 8, 9, 10A and 10B are a flow diagrams illustrating one embodiment for controlling the individual feeder rolls to effectuate separation of stacked products into a sequence of individual products.
Figure 7B:
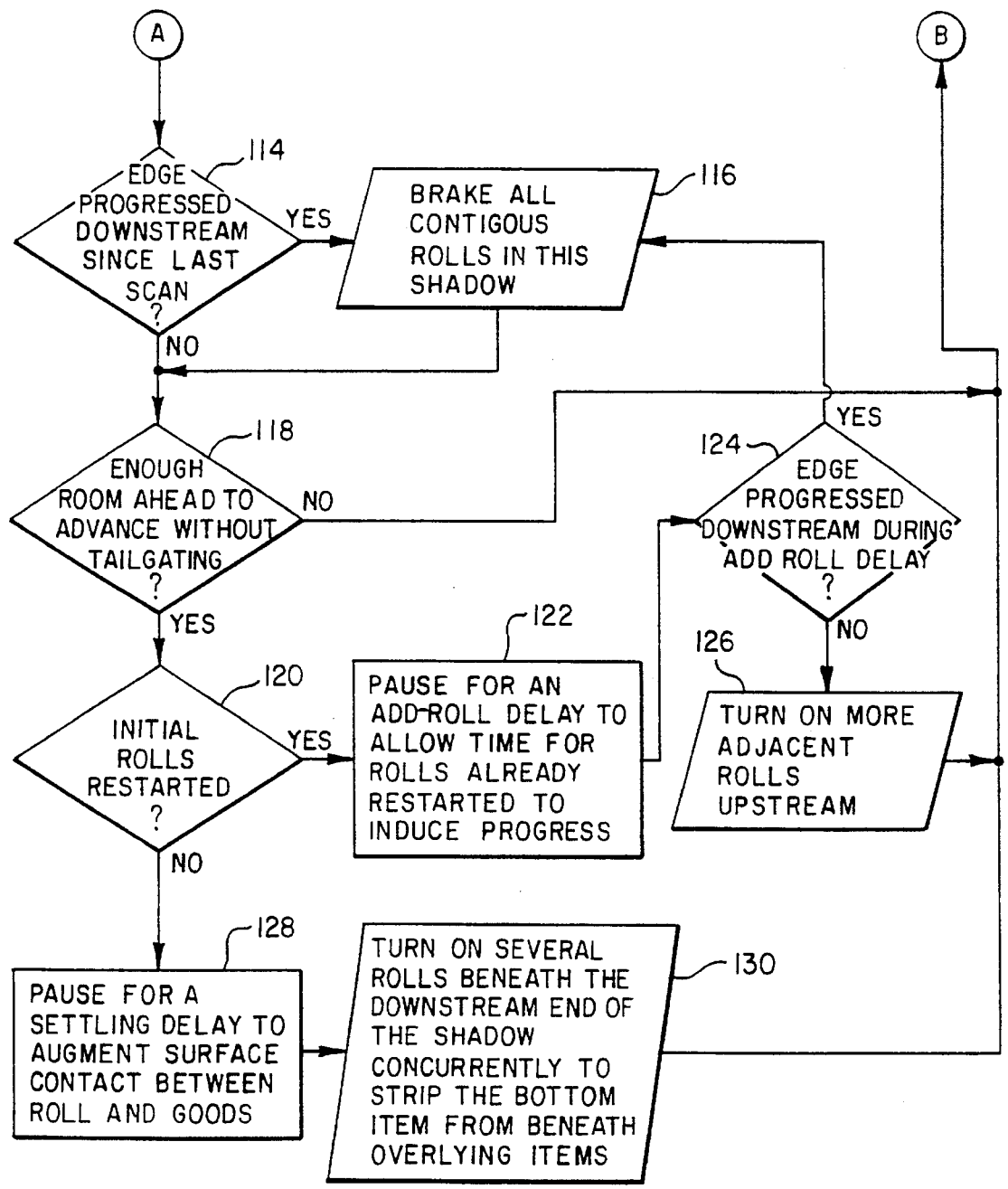
Figure 8:
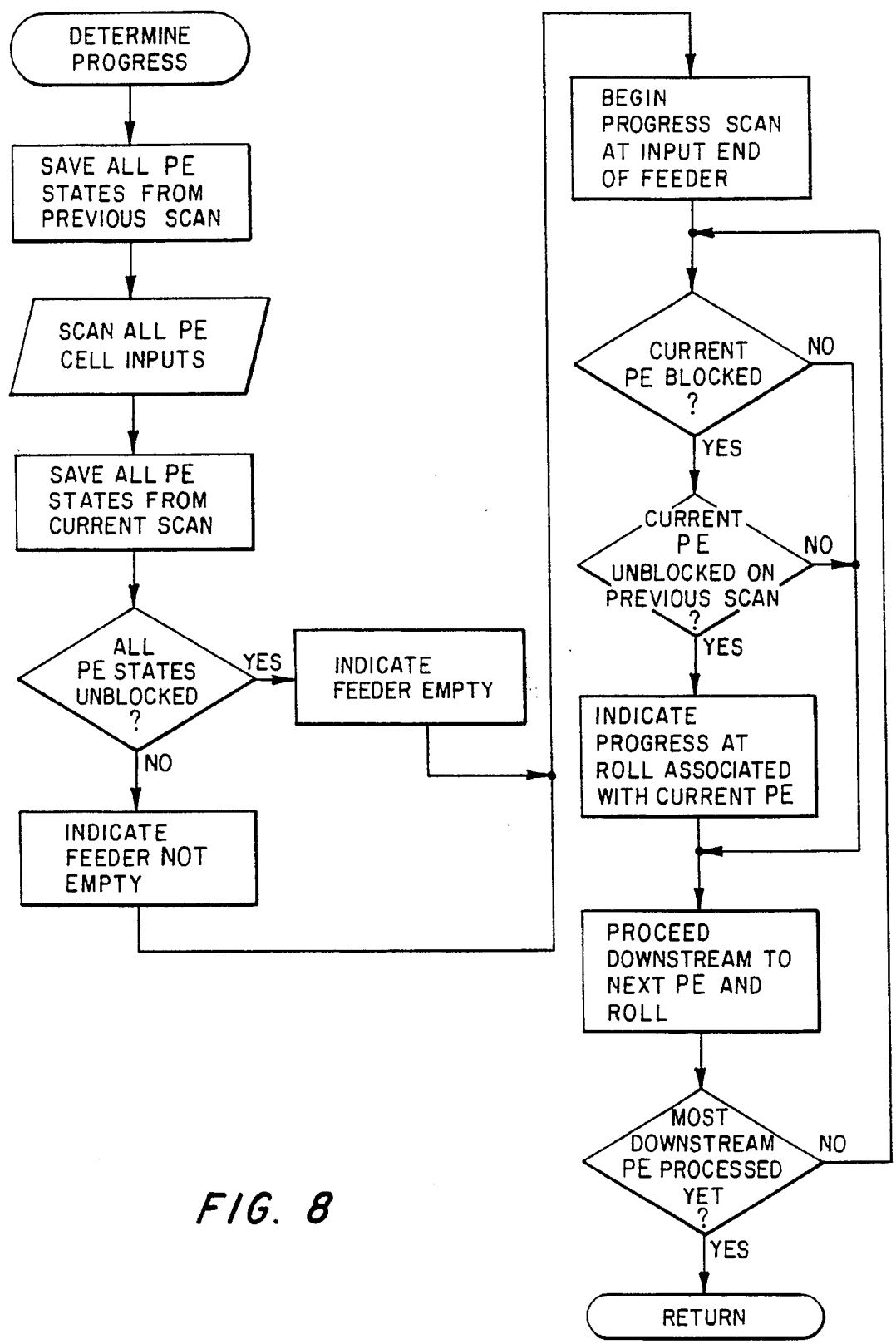
Figure 9:
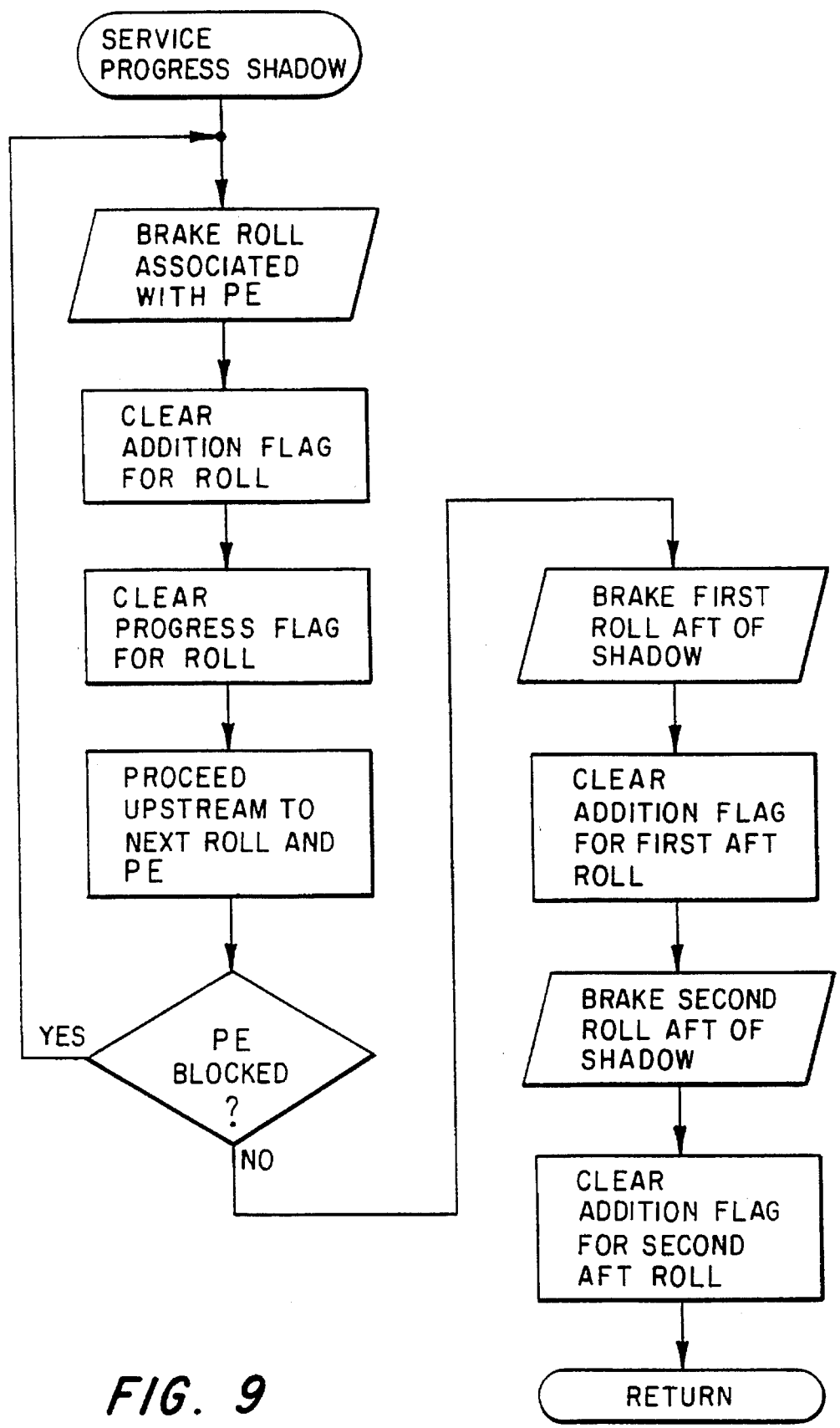
Figure 10A:
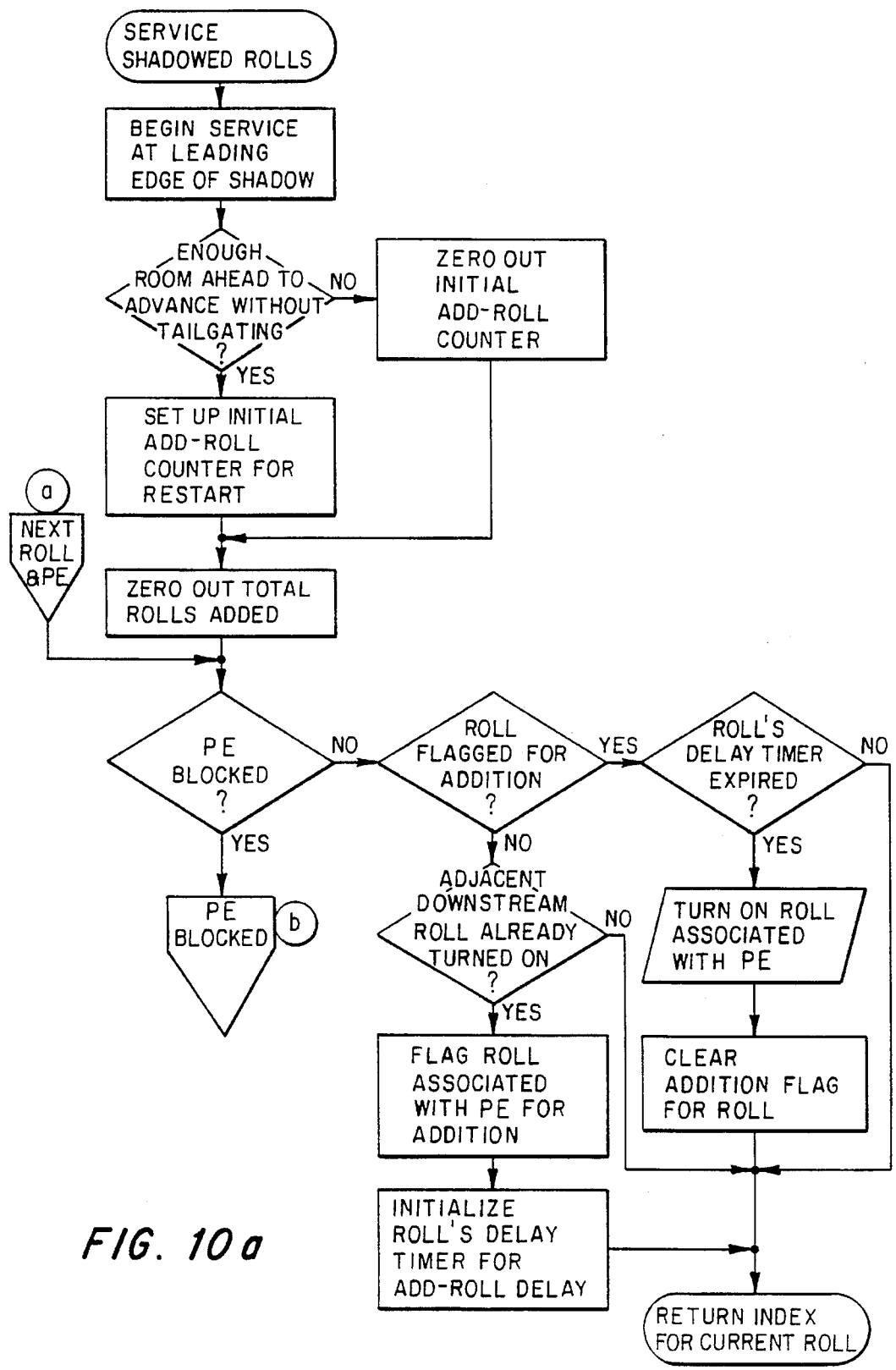
Figure 10B:
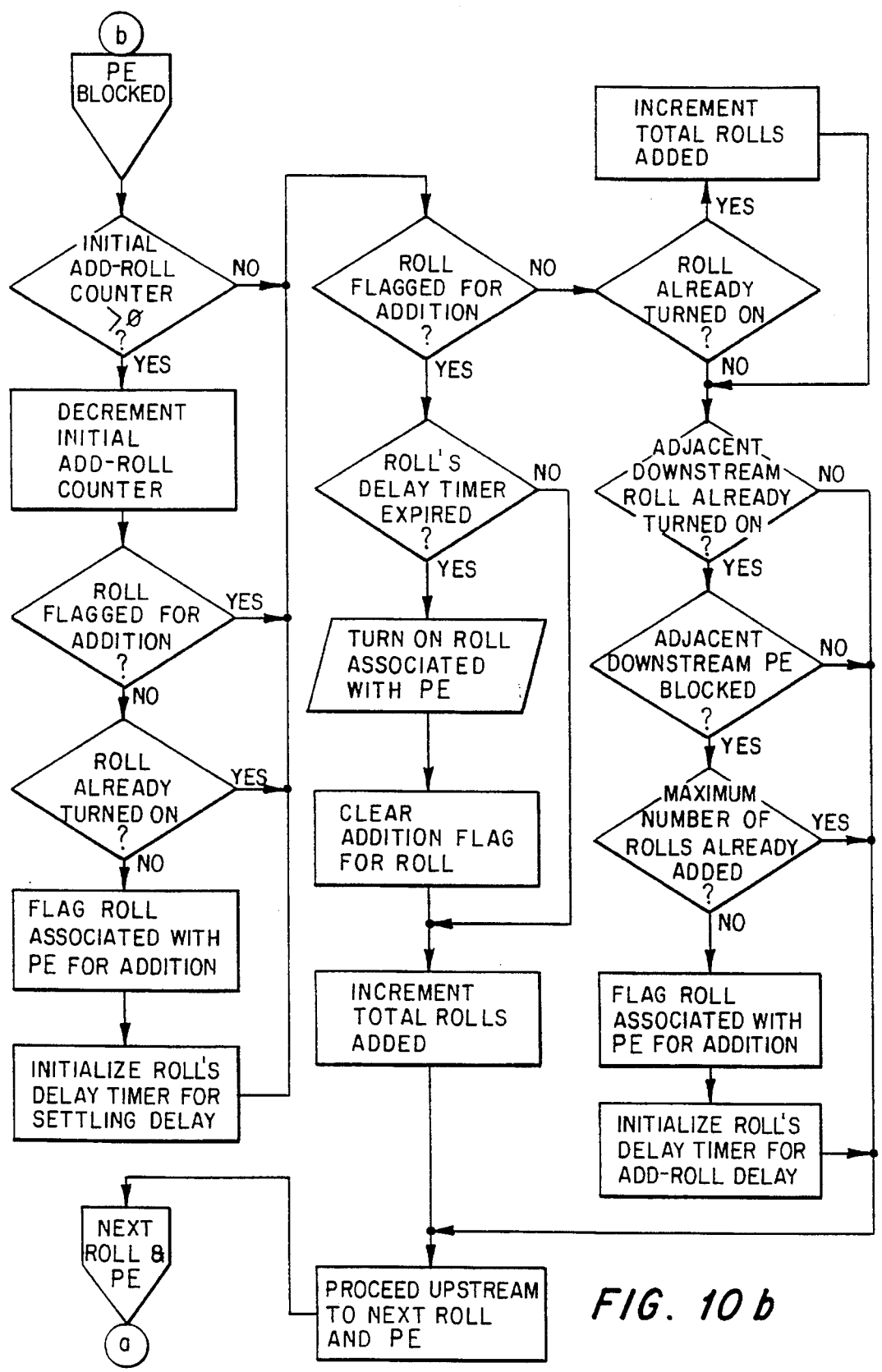

Referring now to the Drawings, and particularly to FIG. 1, there is shown an apparatus 30 for separating, feeding and sorting products. The apparatus 30 defines a transport path illustrated in part by the arrows 32 and 34 and comprising an infeed conveyor belt 40, a feed roller 42, an inclined and laterally tilted separator 44, an output conveyor belt 46, and a divert gate 48. The apparatus 30 further includes a bar code scanner 50 and a central processing unit 60. The main operating components of the apparatus 30 are enclosed within a housing 90.

In the operation of the apparatus 30, bulk stacks of products are loaded by human operators onto the infeed conveyor belt 40 and are directed thereby to the feed roller 42. Computer control of feed roller 42 and infeed conveyor 40 regulates entrance of products onto the separator 44. When the central processing unit 60, through sensing means to be described, fails to detect the presence of products at the upstream end of the separator 44, the central processing unit 60 energizes the infeed conveyor belt 40 and feed roller 42 to move more products onto the separator 44.

The separator 44 consists of a series of individually and selectively controlled feeder rolls 52 arranged on a laterally tilted inclined plane. The central processing unit 60, through sensing means to be described, detects the position and movement of products on the separator 44, and in response energizes the feeder rolls 52 to effect separation of stacks of products into a sequence of individual products.

After separation, the individual products continue to move downstream onto the output conveyor belt 46 where they are transported through a bar code scanner 50. The scanned bar codes are transmitted to the central processing unit 60 and the individual products are sorted by the divert gate 48 into designated receptacles (not shown) in response to control signals from the central processing unit 60. For each scanned product, the bar code is compared to a set of "reject" and "process" bar codes stored in the central processing unit 60. If the scanned bar code matches a stored "reject" bar code, the central processing unit 60 sends a signal to instruct the divert gate 48 to direct the product to a bin (not shown) where it is collected and either recycled or processed manually. If the bar code matches a stored "process" code, the central processing unit 60 generates a signal to instruct the divert gate 48 to direct the product to a bin (not shown) for further processing. If the scanner fails to find a bar code the central processing unit 60 sends a signal to instruct the divert gate 48 to direct the product to a residual bin (not shown) where it is collected and sent back through the apparatus 30 for reprocessing.

The central processing unit 60 preferably comprises a computer capable of directing all of the functions of the separating and sorting apparatus 30 in accordance with a software program that is a principal component therein. The aforementioned computer includes such features as an 80286 CPU, 640K RAM, 1.2 MB floppy disk, 20 MB hard disk, two serial ports and one parallel port. As computers of this type are well known and the detailed construction of the computer itself does not form part of the present invention, further description of the computer is deemed unnecessary.

Sort-and-tally software plans for each product are stored in ASCII data files located either on floppy disk or downloaded to the computer hard drive. Several thousand valid bar codes may be input for a given sort-and-tally software plan. At the end of each run, the computer generates a report for each product that tallies the occurrences of each detected bar code. The report also tallies extraneous bar codes and indicates the total number of products that were diverted because of unreadable bar codes. The computer also performs data acquisition functions, either by means of the aforementioned bar code scanner 50 or by means of sensors to be described. Furthermore, the computer exercises control over the individual elements of the apparatus 30 by energizing the motors powering the infeed conveyor belt 40, feed roller 42, feeder rolls 52, output conveyor belt 46 and divert gate 48.

Referring now to FIGS. 1 and 5, the sensor for regulating entrance of products onto the separator 44 comprises a convergent beam photoelectric cell 80 connected to the central processing unit 60. Convergent beam photoelectric cell 80 detects distance changes between the cell and the object sensed, in this case a product 82. In the preferred embodiment of the apparatus 30, the cell 80 is positioned between the feed roller 42 and the upstream edge of the first feeder roll 52 of the separator 44. Because the feed roller 42 has a much larger diameter than the feeder rolls 52, product 82 does not immediately rest flush with the first feeder roll 52 as shown by the solid line product 82 in FIG. 5. After the product has moved slightly downstream on the separator 44, the trailing edge of the product 82 falls on the first feeder roll 52 of the separator 44 as shown by the broken line product in FIG. 5. The cell 80 "shoots" an infrared sensing beam 84 that responds to the distance change between the solid and broken line product positions and transmits a signal indicative of this position change to the central processing unit 60. If the beam 84 from the cell 80 does not detect the broken line product position, then the central processing unit 60 knows that a product or group of products 82 is not present at the upstream edge of the separator 44. The central processing unit 60 then energizes the power motors for the infeed conveyor belt 40 and feed roller 42 allowing further products to enter the separator 44.

If the beam 84 of the cell 80 detects a broken line product position, the central processing unit 60 knows that there is sufficient product in position on the separator 44. The central processing unit 60 then de-energizes the power motors for the infeed conveyor belt 40 and feed roller 42 inhibiting further products from entering and crowding the separator 44. Operation of the input end of the separator 44 in this manner prevents overloading of the separator 44 permitting the separation process to occur more efficiently and effectively.

Referring now to FIGS. 1, 2, 3, 4 and 6, the separator 44 includes a plurality of individually and selectively controlled feeder rolls 52 arranged on a laterally tilted inclined plane. Each feeder roll 52 is mounted in a frame 54. The drive mechanism for each feeder roll 52 is mounted on the frame 54 and comprises a motor 56. The motor 56 preferably is a constant speed electric motor. However, a variable speed motor may be used. Mounted to the motor 56 is a pulley 58 driving a belt 64 to direct operating power to a second pulley 62 rotatively mounted on the frame 54. The second pulley 62 is mounted to the shaft supporting the feeder roll 52. Thus, in the preferred embodiment, a single motor 56 is utilized to actuate a pulley 58 which in-turn operates, through belt 64 and pulley 62, one feeder roll 52.

The separator 44 has an inside and outside rail, 72 and 74 respectively, and has been laterally tilted with respect to the inside rail 72 and outside rail 74 so that the inside rail is at a lower horizontal elevation (approximately a 7° tilt) than the outside rail. Configuration of the separator 44 in this manner causes products to slide toward and ride next to the inside rail 72. Thus, at the discharge from the separator 44, the products are lined up in a single file against the inside rail 72. This facilitates a more accurate identification of the products by the bar code scanner 50 as described below.

The separator 44 has also been longitudinally positioned to form an inclined plane. Configuration of the separator 44 in this manner allows for utilization of gravitational forces to assist separation of stacked products. Because the coefficient of friction between two stacked products is lower than that between the underlying product and the feeder rolls 52 and because of the angle of incline (approximately 22°) of the separator 44, the overlying products tend to slide backward separating the stack.

In the operation of the separator 44, the feeder rolls 52 are selectively and individually energized by the central processing unit 60, according to a program to be described, in response to position and movement information detected by an array of photoelectric cells 66 located over the inside rail 72 of the separator 44. Each feeder roll 52 has a corresponding photoelectric cell 66 to detect the presence or absence at that roll of the product being processed by the separator 44. The photoelectric cells 66 are positioned to detect an infrared beam 68 through the gap between individual feeder rolls 52 on the separator 44. The infrared beam 68 directed between rollers 52 is reflected by a retroreflector 70 and detected by the photoelectric cell 66. Products riding on the feeder rolls 52 block the infrared beam 68 from the retroreflector 70 creating "shadow" areas on the separator 44. The central processing unit 60 scans the entire array of photoelectric cells 66 to find all shadows on the separator 44 and compares the information obtained to that stored from a previous scan. The central processing unit 60 thus determines the position and relative movement of all products on the separator 44 and decides whether a shadow indicates the presence of a stacked group or an individual product. From these determinations, the central processing unit selectively energizes individual feeder rolls or sets of feeder rolls to separate stacks of products into individual units.

Referring to FIGS. 7A, 7B, 8, 9, 10A and 10B, a subroutine for controlling the feeder rolls 52 is diagrammatically illustrated via a set of flowcharts. The subroutine is particularly directed to scanning the photoelectric cell array 66 and articulating individual feeder rolls or sets of feeder rolls to effectuate the separation of products and continued downstream movement.

Each feeder roll 52 on the separator 44 has a corresponding photoelectric cell 66 and information from a previous scan of the cells array is stored in operational step 100. The array of photoelectric cells 66 is scanned collectively during operation 102 to determine present product placement on the separator 44. Contiguous sequences of blocked photoelectric cells occur in areas where products are resting on feeder rolls. The results of the scan are stored by the central processing unit 60 during operation 104 for later comparison with the most previous scan stored in operational step 100.

In order to minimize friction ahead of an advancing product, all feeder rolls not currently in shadowed areas, i.e. not covered by a product or a group of products, are energized. The subroutine scans the photoelectric cell array starting at the downstream/output end during sequence 108 and searches for the leading edges of all products. When a leading edge is not detected by a photoelectric cell during inquiry 110, the subroutine energizes during sequence 112 that cell's corresponding feeder roll. Once a leading edge has been detected as determined during decision sequence 110, the subroutine compares the present scan array stored during operation 104 with the previous scan array stored during operational step 100 to determine in decision sequence 114 if the leading edge of the shadow has progressed downstream. This operation is shown in more detail in FIG. 8. When progress of the leading edge of a shadowed area is detected, all rollers in the shadowed area are switched into a braking mode during sequence 116. This operation is shown in more detail in FIG. 9.

The subroutine then begins the process of servicing each shadowed roll on the separator. This process is shown in detail in FIGS. 10A and 10B and described below with reference to FIGS. 7A and 7B. Before restarting any rollers in the shadowed areas, the subroutine tests in decision sequence 118 if there are enough unblocked photoelectric cells downstream from the leading edge of the shadowed area to permit downstream movement without tailgating. If there is not enough space for further downstream movement, the subroutine advances to inquiry sequence 132 for recycling through the subroutine. Inquiry sequence 132 tests to determine if the subroutine has serviced all shadows, i.e. has progressed to the upstream edge of the separator. If all shadows have not been serviced, the subroutine returns to sequence 108 to service the next upstream shadow.

When there is enough space for further downstream movement, the subroutine advances to inquiry sequence 120 to test if initial feeder rolls have been restarted. If the initial rolls have not been restarted as determined during inquiry sequence 120, then the subroutine advances to operational sequence 128 for a settling delay.

The settling delay resulting from operation of sequence 128 then occurs before any feeder rolls are restarted in the shadowed area. This delay allows the feeder rolls in the shadowed area to establish better contact with the underside of the underlying product. This maximizes the friction force available to move the product downstream and induces a "start/stop" motion to cause the overlying products to separate from the individual underlying product. After the settling delay has expired, and if no tailgating problems exist, the subroutine during sequence 130 energizes several feeder rolls beneath the leading edge of the shadowed area. This action attempts to induce rapid acceleration of the underlying product at the leading edge of the stack to pull the underlying product from the stack.

Once these initial feeder rolls have been started, the subroutine advances to the inquiry sequence 132 and because one control cycle has yet to be completed, the subroutine returns to the inquiry sequence 120 to continue service of each upstream shadow. Since the initial feeder rolls have been restarted, the subroutine advances from inquiry sequence 120 to add-roll delay sequence 122 to pause and wait for downstream progress to occur at the shadow currently being serviced. Inquiry sequence 124 tests to determine if the shadow edge has progressed downstream during the add-roll delay sequence 122 and if progress has occurred, the subroutine advances to braking sequence 116. If progress has not occurred, then, the subroutine adds a new feeder roll upstream from and adjacent to the presently energized feeder rolls in the shadowed area during sequence 126. Next the subroutine advances back to inquiry sequence 132 and services the next upstream shadow. Additional feeder rolls under shadowed areas are added on a one by one basis across several successive control cycles until either new progress occurs or all rollers in the shadowed area are turning. Once the subroutine has completed one control cycle by servicing all shadows on the separator, the subroutine returns to operational step 100 through inquiry sequence 132 to restart the process. This process of selectively energizing feeder rolls continues for each shadowed area until no shadowed areas are detected. When the separator is empty, all feeder rolls are turned off.

Although a preferred embodiment of the invention has been illustrated in the accompanying Drawings and described in the foregoing Detailed Description, it will be understood that the invention is not limited to the embodiment disclosed but is capable of rearrangements and modifications of parts and elements without departing from the scope of the invention.

I claim:

1. Apparatus for transporting products while maintaining a pre-determined distance between them, comprising:

a plurality of juxtaposed feeder rolls, each individually and selectively controlled, for transporting a stream of products in a downstream direction, the feeder rolls positioned such that the transported products pass directly on the periphery of adjacent feeder rolls;

means for sensing the location of each product on said plurality of feeder rolls and generating location signals indicative thereof;

means responsive to the location signals for determining the distance between consecutive products;

means responsive to the determined distance for generating a spacing control signal; and control means including means responsive to the spacing control signal to selectively actuate one or more feeder rolls under a product when the distance between the product and the preceding product in the stream of products varies from a pre-established distance to maintain the pre-established distance.

2. A method for separating products along a feeder roll transport comprised of individually and selectively controlled feeder rolls juxtapositioned such that a product passes directly on the periphery of adjacent feeder rolls, comprising the steps of:

sensing the location of products along the feeder roll transport;

identifying stacked products located on the feeder roll transport;

varying the rotation speed of one or more of the feeder rolls under a located stack of products to augment surface friction between a product in the stack and the feeder rolls;

selectively increasing the speed of rotation of individual feeder rolls of the feeder roll transport under an identified stack of products on a one-by-one basis starting with the feeder roll in the most downstream position to strip a product from the stack of products; and repeating the above steps to separate stacks of products into a singulated product stream.

3. Apparatus for transporting products, comprising:

a conveyor including a plurality of juxtaposed, individually and selectively controlled feeder rolls positioned to transport products on the periphery of adjacent feeder rolls, the conveyor further having an infeed end at a first elevation for receiving products and a discharge end at a second and higher elevation for outputting a stream of singulated products for further processing;

a plurality of means at selected locations for sensing the location of products on the plurality of feeder rolls between the infeed end and the discharge end and generating location signals indicative thereof;

means for receiving and processing location signals generated by said plurality of means for sensing to identify the location of and distance between singulated products and the location of overlapping product stacks on the plurality of feeder rolls, said means for receiving and processing including means for storing previously generated location signals and further including means for comparing the most recently generated location signals to previously generated and stored location signals to detect the location of overlapping product stacks and generate an output;

means for generating a separation signal in response to the output of the means for comparing, for selectively actuating individual feeder rolls of the plurality of feeder rolls under a located overlapping product stack to strip products from the product stack, thus separating identified overlapping product stacks into a stream of singulated products;

control means responsive to the separation signal for varying the rotation speed of the feeder rolls to augment surface friction contact between the feeder rolls and a product in an overlapping product stack, said control means including means for establishing a pre-determined delay before varying the rotation speed of the feeder rolls to separate identified overlapping products by stripping a product from the overlapping product stack; and means for generating a spacing signal in response to the location signals for actuating individual feeder rolls of the plurality of feeder rolls under a located single product when the distance between the single product and a preceding product in the stream of products varies from a pre-established spacing thus maintaining the pre-established spacing between identified consecutive, single products.

4. The apparatus for transporting as set forth in claim 3 wherein said control means further includes means responsive to the separating signal and the spacing signal for selectively controlling the speed of rotation of the feeder rolls under identified single products or overlapping product stacks to separate identified overlapping product stacks or maintain spacing between identified consecutive, single products.

5. The apparatus for transporting as set forth in claim 3 including means for mounting said conveyor on an inclined plane to assist in the separation of products.

6. A method for separating products along a feeder roll transport having an infeed end and a discharge end and including a plurality of rotatable feeder rolls juxtapositioned such that a product passes directly on the periphery of adjacent feeder rolls, comprising the steps of:

sensing the location of products along the feeder roll transport between the infeed end and the discharge end overlaying at least two juxtapositioned feeder rolls and generating locations signals indicative thereof;

processing the location signals to identify stacked products on the feeder roll transport;

selectively and individually controlling the rotation of one or more feeder rolls under an identified stack of products to augment surface friction contact between a product in the stack and stopped feeder rolls;

activating the rotation of at least one stopped feeder roll of the feeder roll transport under an identified stack of products to effect a separation of the stack into a sequence of individual products by stripping a product from the stack of products; and repeating the foregoing steps to separate products on the transport into a sequence of individual products.

7. The method as in claim 6 wherein the step of activating the rotation of at least one feeder roll includes the steps of:

sensing movement of products in the stack of products along the feeder roll transport path; and activating the rotation of additional feeder rolls under the stack of products in sequence on a one-by-one basis when sensing no movement of a product in the stack to thereby strip the product from the stack of products.

8. Apparatus for separating products, comprising:

a plurality of juxtapositioned feeder rolls, each selectively actuated and controlled, said feeder rolls defining a transport having an infeed end at a first elevation for receiving products and a discharge end at a second higher elevation for outputting a stream of singulated products for further processing, the feeder rolls positioned such that a product passes directly on the periphery of adjacent feeder rolls;

a plurality of means at selected locations for sensing the location of stacked and singulated products along the transport and generating location signals indicative thereof;

a control unit connected to said plurality of means for sensing for receiving and processing location signals generated by said means for sensing to identify the location of stacked and singulated products along the transport, said control unit including means for storing previously generated location signals and further including means for comparing the most recently generated location signals to previously generated and stored location signals to detect the location of overlapping product stacks and in response thereto generating control signals; and control means responsive to the control signals for selectively actuating one or more individual feeder rolls to separate stacked products, said control means controlling the selective actuation of one or more feeder rolls under a located stack of products to first stop the feeder rolls to augment surface friction contact between the feeder rolls and the stack of products and, following a predetermined delay, actuating at least one feeder roll under the stack of products to strip a product from the stack of products, said control means further including means responsive to the control signals to control the actuation of one or more feeder rolls under a product when the distance between the product and a preceding product varies from a predetermined distance.

9. The apparatus as in claim 8 further including means for mounting the plurality of feeder rolls on an inclined plane.

10. Apparatus for transporting products, comprising:

conveyor means having an infeed end for receiving products and a discharge end for outputting a stream of singulated products for further processing, said conveyor means comprising a plurality of feeder rolls, each individually and selectively controlled, said feeder rolls positioned such that the products pass directly on the periphery of adjacent feeder rolls;

means for sensing the location of products along said conveyor means and generating location signals indicative thereof;

means for receiving and processing location signals to identify the location of single and stacked products on the conveyor means, and in response thereto generate control signals;

first control means responsive to the control signals for selectively actuating one or more feeder rolls starting with the feeder roll in the most downstream position under a located product stack to strip products from the product stack into a stream of singulated products said first control means, including:

means responsive to control signals for selectively controlling the actuation of the one or more feeder rolls under stacked products to augment surface friction contact with a product;

means responsive to the control signals for selectively actuating at least one of the feeder rolls under the stacked products to strip a product from the product stack; and second control means responsive to the control signals for selectively actuating one or more feeder rolls starting with the feeder roll in the most downstream position under a single product when the distance between the product and a preceding product in the product stream varies from a predetermined distance to maintain separation between consecutive products.

11. Apparatus for transporting products as set forth in claim 10 wherein the conveyor means includes means for mounting said plurality of selectively controlled feeder rolls on an inclined plane to assist in the separation of products into a stream of single products.

12. Apparatus for processing products along a transport comprised of a plurality of juxtapositioned, individually and selectively controlled feeder rolls, comprising:

means for sensing the location of products on the transport;

means for identifying stacked products and single products on the transport;

means for determining the distance between consecutive single products on the transport;

means for activating one or more feeder rolls located under each sensed single product when the distance to a preceding product on the transport varies from a predetermined distance until the predetermined distance has been achieved thereby maintaining spacing between consecutive products;

means for activating one or more feeder rolls located under each sensed stack of products on the transport to strip products from the product stack into a stream of singulated products; and means for momentarily deactivating feeder rolls upon detection of product movement in the stack of products to augment surface friction contact between the feeder rolls and the product stack such that subsequent activation of at least one feeder roll located under the stack of products strips the product from the product stack.

13. Apparatus for separating stacked products transported along a transport comprised of individually and selectively controlled feeder rolls juxtapositioned such that a product passes directly on the periphery of adjacent feeder rolls, comprising:

a plurality of means at selected locations for determining the location of products along the transport;

means for comparing the present location of products along the transport with a past location to detect product movement;

means for selectively stopping feeder rolls located under stacked products to augment surface friction contact between a bottom product in a stack of products and the feeder rolls; and means for selectively energizing one or more feeder rolls beneath the product stack to strip the bottom product out from under the stack.

* * * * *